Oct. 28, 1941.  L. DILLON  2,260,562
PROCESS AND APPARATUS FOR CORE SAMPLE ORIENTATION
Filed Dec. 13, 1937  2 Sheets—Sheet 1
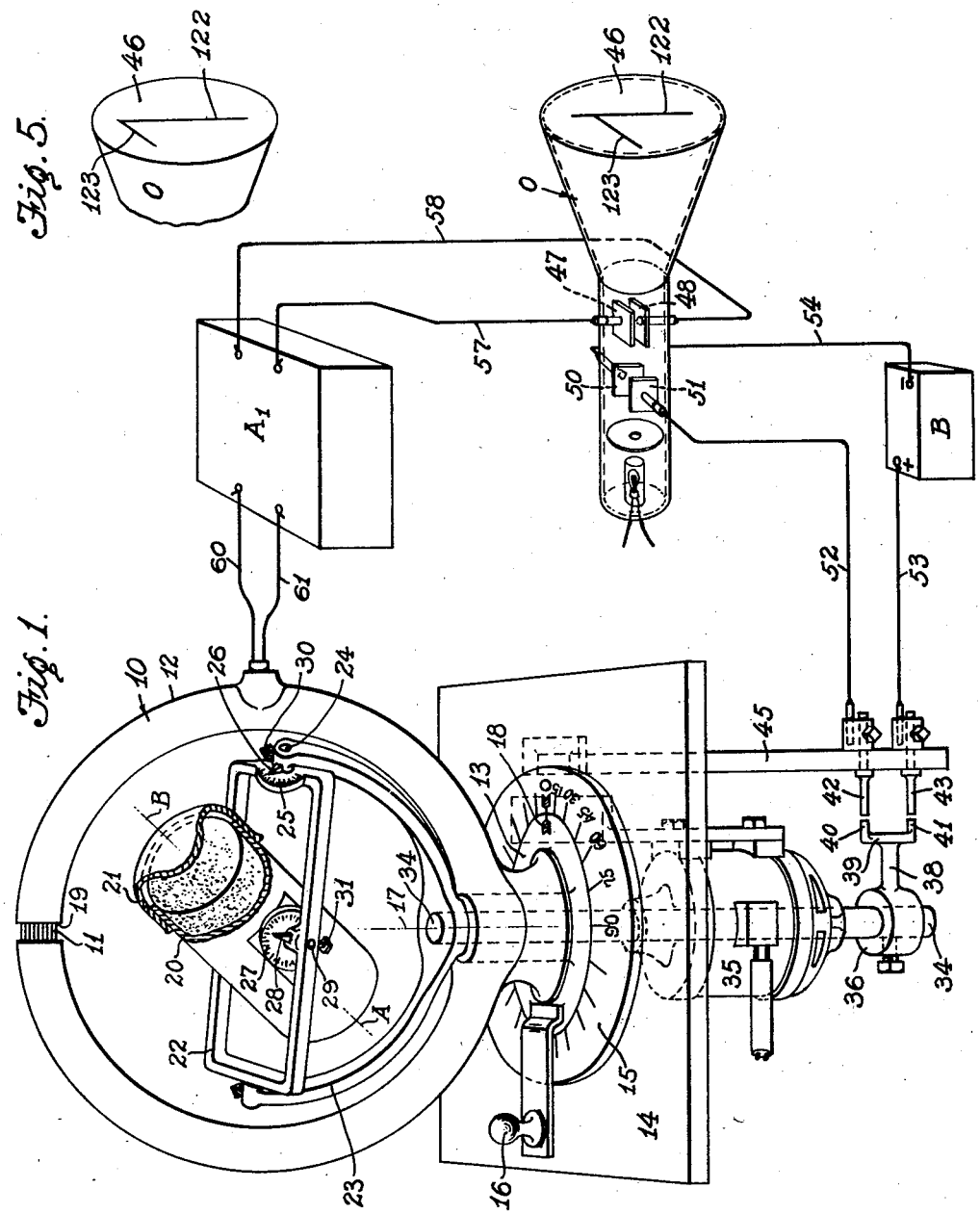
INVENTOR.
Lyle Dillon
BY Philip Subkow
ATTORNEY.

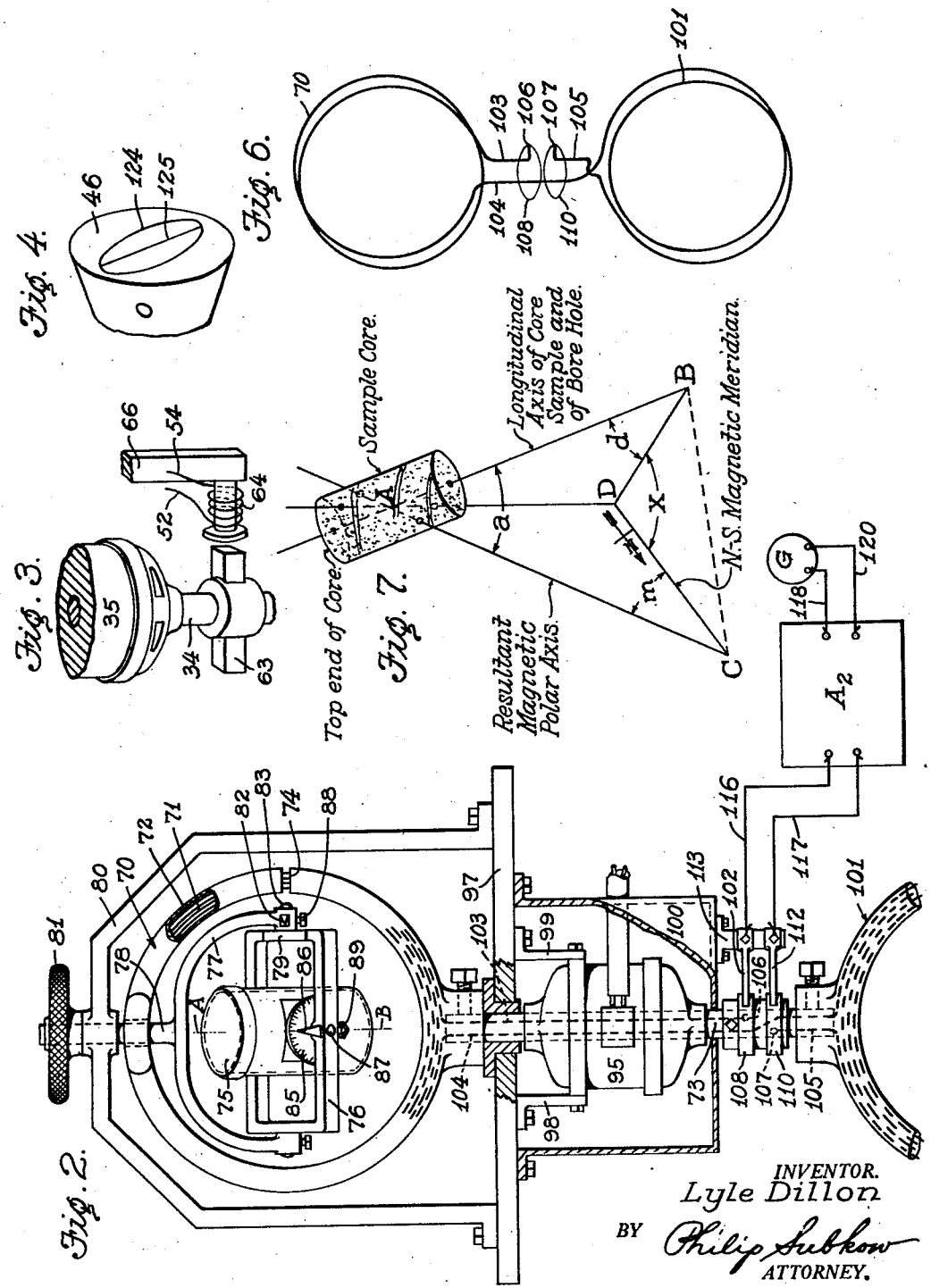

Patented Oct. 28, 1941

2,260,562

UNITED STATES PATENT OFFICE 2,260,562

PROCESS AND APPARATUS FOR CORE SAMPLE ORIENTATION

Lyle Dillon, San Gabriel, Calif., assignor to Union Oil Company of California, Los Angeles, Calif., a corporation of California Application December 13, 1937, Serial No. 179,541

15 Claims. (Cl. 175—182)

This invention relates to the determination of the magnetic polar orientation of solid substances and particularly earth samples such as cores recovered from drilled wells.

It has been discovered that many sedimentary earth strata have connate magnetic properties which are present therein by reason of the inclusion during the period of sedimentation of quantities of magnetic mineral particles which either oriented themselves under the influence of the earth's magnetic field at the time of sedimentation or have become permanently magnetically polarized while under the influence of the earth's magnetic field during the ages subsequent to sedimentation.

Certain igneous rocks also display magnetic properties which are attributed to the oriented formation of crystals of magnetic minerals during the slow cooling conditions usually attendant upon the past history of such rock formations.

At any rate it has been discovered that many rock samples of both sedimentary and igneous origin display definitely oriented magnetic polarities.

It is an object of this invention to present a method and apparatus for detecting and determining the presence and polar orientation of such connate magnetic properties in earth strata samples.

The determination of magnetic properties of such bodies by means of a static magnetometer is known but these methods are limited in sensitivity and subject to error caused by the mutual action between the magnetometer magnets and the magnetic materials of the earth test sample.

It is therefore a further object of the present invention to provide methods and apparatus for determining magnetic polarization of earth strata samples which are accurate and of sufficient sensitivity to be applicable to samples having exceedingly feeble natural magnetic field intensities.

The determination of the magnetic polar orientation of the earth strata samples has its chief application to the determination of the dip and strike of remote or deep earth strata from which the samples have been recovered, for example, deep strata from which drilled core samples have been taken in the process of oil well drilling.

It has been proved that the magnetic polar orientation of the recovered sample corresponds in alignment with the same polarization of the permanent or residual magnetic field existing in the depths of the drilled strata. Therefore, having determined the magnetic polarization of the core sample and with the direction of the magnetic field in the formation from which the core has been removed known, and with the vertical inclination of the bore hole from which the core has been removed also known, the original position of the core in the stratum is reestablished. If the thus oriented core sample shows stratification, as it often does, the dip and strike of such visible strata is also thus established.

The invention accordingly comprises in brief, rotating the magnetic earth strata sample in inductive relation to a field coil whereby an alternating current of rotational frequency is induced in said coil and ascertaining from said induced alternating current the magnetic polar axis of said earth sample.

The invention also comprises determining the magnetic polar orientation of the core sample by suitable means correlating said magnetic polarity with the connate magnetic field in the stratum from which the core sample was removed, measuring the vertical deviation of the portion of bore hole from which the core sample was removed, and determining from these data the dip and strike of the earth's strata corresponding with those visible in the core sample.

Other objects and features of the invention will be evident hereinafter.

The accompanying drawings illustrate preferred embodiments of the invention.

Figure 1 illustrates, in partially diagrammatic form, a perspective elevation of a general arrangement of one embodiment of the invention.

Figure 2 illustrates an elevation partially in section of an optional embodiment of the invention.

Figure 3 illustrates an optional arrangement of the synchronizing current control mechanism of Figure 1.

Figure 4 illustrates the general type of Lissajous diagram produced on the fluorescent screen of the oscilliscope when a current generator timer of the type illustrated in Figure 3 is employed in connection with the apparatus of Figure 1.

Figure 5 illustrates one type of figure produced upon the fluorescent screen of the oscilliscope when a timer of the type illustrated in Figure 1 is employed.

Figure 6 is a wiring diagram illustrating the method of connecting the inductor coils of Figure 2.

Figure 7 is a diagrammatic illustration of the method of determining the orientation of the core sample in space corresponding to that which it had prior to being detached from the drilled formation.

Referring to Figure 1. The apparatus comprises an inductor coil 10 comprising a plurality of turns of wire, as shown at 11, wound within a hollow tubular ring shaped shield or housing 12. This shield is provided with a flared circular base 13 which is in turn rotatably mounted upon a metallic base plate 14 and retained within a stationary graduated ring 15, attached to said plate. The inductor coil 10 with its housing 12 and circular base 13 is thus free to be turned by means of handle 16 about its vertical axis 17 and within the said ring 15. The ring 15 is graduated in degrees of arc about its inner edge whereby the horizontal angular displacement of the plane of the inductor coil about its axis 17 may be indicated upon the graduations by means of an arrow 18, carried on the flared inductor coil base 13. The inductor coil shield 12 is provided with a narrow gap at 19 to break the electrical continuity of the conductive loop which it otherwise would form, and this gap may be filled with a section of suitable insulating material.

A core sample container 20 having a cover 21 is pivotally mounted in gimbals which comprise a ring 22 and a fork 23, whereby the said container 20 may be rigidly positioned with its longitudinal axis lying in any desired direction in space.

A graduated sector 25 attached to the end of the gimbals ring 22 and a pointer 26 attached to the adjacent end of the supporting fork 23 with the common pivot 24 as a center serve to indicate the angular position of the plane of said ring 22 with respect to the horizontal. A similar graduated sector 27 carried by the core container 20 and a pointer 28 is carried by the gimbals ring 22 with the common pivot 29 as a center serve to indicate the angle of the longitudinal axis of the core container with respect to the plane of the said ring 22. The ring 22 and core container 20 may be rigidly clamped in any given position by means of the set screws 30 and 31 acting upon their respective pivot shafts 24 and 29. The supporting fork 23 is fixed upon the upper extended end of the vertical motor shaft 34 which passes through the inductor coil base 13 and suitable bearings therein. The shaft 34 is driven preferably by means of a synchronous alternating current motor 35, adapted to operate at a speed of approximately 1800 R. P. M.

The coil shield 12, gimbals and motor shaft 34 are composed of nonmagnetic material and the gimbals, core container and upper end of the motor shaft are preferably constructed of nonconductive material such as Bakelite.

The lower extension of the vertical motor shaft 34, is provided with a phase timer mechanism consisting of a hub 36 fixed on the motor shaft, an insulating arm 38 extending radially from said hub and carrying a metallic cross bar 39 which in turn carries a pair of contact points 40 and 41. A pair of stationary contact brushes 42 and 43 are supported by means of a column 45 extending downward from the base plate 14 and may be adjusted to make momentary electrical contact with the points 40 and 41 at each revolution of the motor shaft. A cathode-ray oscilliscope, of a conventional design, is shown at O provided with a fluorescent screen 46, vertical deflection plates 47 and 48 and horizontal deflection plates 50 and 51. Electrical conductors 52, 53 and 54 serve to electrically connect brushes 42 and 43, the high voltage battery B and the horizontal deflection plates 50 and 51 in series.

The vertical deflection plates 47 and 48 are connected by means of electrical conductors 57 and 58 to the output terminals of a suitable vacuum tube amplifier A₁, the input terminals of which are in turn connected by means of the electrical conductors 60 and 61 in parallel with the before mentioned inductor coil 10.

Instead of employing contact points as shown in Figure 1, a bar magnet 63 transversely attached to the lower extension of the motor shaft 34 as shown in Figure 3 may be employed to magnetically induce upon rotation, a suitable alternating current in an adjacent stationary coil 64. This coil 64 is supported in inductive relation and adjacent the path of rotation of the ends of the bar magnet 63 by means of the vertical supporting column 66 extending downward from the underside of the supporting base plate 14, in the same manner as column 45 of Figure 1.

In Figure 2, instead of providing for rotating the core sample in the plane of the stationary inductor coil as shown in Figure 1, provision is made for rotating the inductor coil around the stationary core sample. An inductor coil 70, similar to the previously mentioned inductor coil 10, and having a plurality of turns of wire 71 carried in a tubular metallic shield 72 is fixed upon the end of the upper extension of the vertical motor shaft 73. A narrow gap 74 is provided to break the electrical continuity of the tubular shield 72 as in the case of the shield 12 in Figure 1. The core container 75 is pivotally mounted in gimbals comprising a ring 76, which is pivotally supported by the fork 77 which is in turn supported by a vertical column 78, which passes through the upper portion of the supporting bracket 80, and carries a handle 81 at the top end. The said gimbals serve to rigidly support the core sample in the core container 75 within the plane of the inductor coil 70 and with its axis adjustable to any desired angle with respect to the vertical axis about which the inductor coil 70 rotates. The core container and gimbals structure are constructed of nonmagnetic and preferably nonconductive material.

A graduated sector 79 attached to the end of the gimbals ring 76 and a pointer 82 attached to the adjacent end of the supporting fork 55 with the common pivot 83 as a center serve to indicate the angular position of the plane of said ring 76 with respect to the horizontal. A similar graduated sector 85 carried by the core container 75 and a pointer 86 carried upon the gimbals ring 76 with the common pivot 87 as a center serve to indicate the angle of the longitudinal axis A—B of the core container with respect to the plane of said ring 76. The ring 76 and the container 75 may be rigidly clamped in any given position by means of the set screws 88 and 89 acting upon their respective pivot shafts.

The motor 95, by means of which the shaft 73 and the attached inductor coil 70 are rotated, is supported from the lower side of the metallic base plate 97 by means of suitable brackets 98 and 99. The motor is enclosed in a metallic shield 100.

The lower extension of the motor shaft 73 carries a second shielded inductor coil 101 preferably of identical size and shape and containing the same number of turns as the inductor coil 70. The inductor coils 70 and 101 are mounted upon the common vertical shaft 73 with their planes parallel, and the coil turns are electrically connected together in opposition, as illustrated in the wiring diagram Figure 6. The inductor coils are connected in series by means of conductors 103, 104 and 105 which pass through a drilled passageway through the motor shaft and terminate at 106 and 107 in electrical connection with slip rings 108 and 110 respectively. Flexible brushes 102 and 112 which are stationarily supported by means of bracket 113 from the lower surface of the motor shield 100 make sliding contacts with the said slip rings 108 and 110 and are in turn electrically connected by means of conductors 116 and 117 of the input terminals of a suitable amplifier A2. The output terminals of the amplifier A2 is connected by means of the electrical conductors 118 and 120 to a sensitive milliameter or galvanometer G.

Figure 4 shows the type of Lissajous diagrams which may be described upon the fluorescent screen 46 of the osciliscope O when its vertical deflection plates are connected to the inductor coil of Figure 1 and the horizontal deflection plates connected to the timing mechanism of Figure 3.

Figure 5 illustrates a variation of the type of Lissajous figure which may be described upon the fluorescent screen of the oscilliscope of Figure 1 upon adjustment of the plane of the inductor coil 10 so that the induced current is in phase with the timing current impulse.

Referring again to Figure 1, the operation is as follows:

The core sample which has been recovered from a bore hole and which is to be tested to determine the axis of magnetic polarization, is preferably reduced in size, such as by grinding or turning on a suitable lathe to remove adhering layers of mud and sand and other foreign substances and to shape it to a suitable cylindrical form which will fit snugly into the core container 20. The core sample is preferably shaped so that its length and diameter are substantially equal and with ends slightly rounded so that the whole approaches a spherical shape. The core sample is firmly retained within the core container 20 by the cover 21. After the core sample is in place in the container it is rotated rapidly by means of the electric motor 35 about the vertical axis 17 and in the plane of the inductor coil 10. If the core sample is appreciably magnetically polarized its rotation within the plane of the inductor coil 10 and in inductive relation with the turns therein will induce electromotive force and a corresponding resultant electric current flow from the inductor coil 10 through the interconnecting conductors 60 and 61 to the amplifier A1. The thus induced electromotive force and resultant electric current will be alternating and have a frequency corresponding to the rotational frequency of the said core sample. The thus generated amplified alternating current may be lead to the vertical sweep deflection plates 47 and 48 of the oscilliscope O by means of the interconnecting conductors 57 and 58. When the oscilliscope O is suitably energized to produce an electron beam the said beam is deflected by the alternating potential impressed upon the deflection plates 47 and 48 through a vertical angle at the said rotational frequency to form a vertical luminous line as shown at 122 upon the fluorescent screen 46 of the oscilliscope O.

During rotation of the core sample within the inductor coil 10, as before described, the contacts 40 and 41 of the phase timer which are carried by the arm 38 upon the lower end of the motor shaft, cause the circuit between the flexible contact brushes 42 and 43 to be intermittently closed at the frequency of and in synchronism with the said rotation of the core sample. The source of a high voltage direct current B, is thus intermittently connected by way of the electrical conductors 52, 53 and 54 and contact brushes 42 and 43 across the horizontal sweep electrostatic deflection plates 50 and 51 in the oscilliscope O. Upon each of such momentary contacts the electron beam is instantly deflected horizontally causing a horizontal luminous line or mark 123 on the fluorescent screen of the oscilliscope O and since the intermittent contacts are in synchronism with the rotation of the core sample the said momentary horizontal mark will occur once for each cycle of the vertical sweep and in synchronism therewith. The phase relationship between the alternating current generated by the rotation of the core sample and the momentary electrical impulse transmitted by the timer to the oscilliscope O upon completion of the circuit between contactors 42 and 43 may thus, obviously, be determined by the shape of the figure described upon the fluorescent screen of the oscilliscope O. The position of the horizontal mark 123 intermediate the ends of the vertical line 122 as shown in Figure 1 is a measure therefore of the phase-time relationship between the electrical impulse impressed upon the horizontal and vertical deflection plates respectively, and hence also a measure of the phase angle relationship about the shaft axis 17 as a center between the magnetic pole of the core sample and the contacts 40 and 41 of the timing mechanism.

The angular phase relationship between the timing contactors and any given vertical plane passing through the core sample may be altered by adjusting the angle of the plane of the inductor coil 10 about its vertical axis 17 by means of handle 16. The phase relationship between the contactor impulses and the alternating current generated by the rotating magnetized core sample may thus be adjusted to any desired angle. For example, the plane of the inductor coil 10 may be rotated about the axis 17 to alter the phase relationship until the horizontal line 123 of the oscilliscope figure is caused to move in its position along the length of the vertical line 122. For example when the plane of the inductor coil 10 has been adjusted to a position about the axis 17 at which the induced potential in the said inductor coil 10 is either at a maximum or a minimum at the moment of completion of the battery circuit by the timer contacts 42—43 the form of the oscilliscope diagram will be such that the horizontal line 123 will extend horizontally from either the lower or upper extreme ends of the vertical line 122 as illustrated in Figure 5. The end of the vertical line 41, from which the horizontal line 123 thus extends when so adjusted depends upon whether the contact is made at the peak of the positive or negative half cycle of the alternating potential generated in the inductor coil and this may obviously be correlated with and thus provide an indication of the sense of the magnetic polarization of the rotating core sample under test.

Having thus adjusted the plane of the inductor coil 10, as described, the angular displacement thereof about the axis 17 as indicated by arrow 18 upon the graduated circle 15 will be in direct indication of the angle between the vertical plane of one component of the magnetic pole of the core sample and the timer arm 38.

The core sample container 20, as described hereinbefore, may be positioned in the gimbals with its axis in any desired direction in space. The position of the core sample may thus be adjusted with respect to the rotational axis 17 by trial and error until a position is found which will produce a maximum vertical deflection of the oscilliscope beam as indicated by the length of the vertical line 122. At this position it is known that the resultant magnetic polar axis of the core sample is being rotated in a horizontal plane.

With both horizontal and the vertical planes of maximum magnetic polarization with respect to the axis 17 thus established, the actual resultant magnetic polar axis of the core sample with respect to its physical longitudinal axis A—B is thus determined, and it lies through the core sample on the line of intersection of the two said planes.

Instead of employing contact points 40—43 in the timing mechanism as shown in Figure 1, an alternating current generator, as illustrated in Figure 3 may be employed. Upon rotation of the core sample within the inductor coil 10 the bar magnet 63 attached to the lower extension of the motor shaft 34 is also rotated in inductive relation to the coil 64 thereby causing an alternating electromotive force to be induced therein at a frequency equal to that induced in the inductor coil 10. The alternating potential thus induced in the coil 64 may be conducted through an amplifier if necessary or applied directly to the horizontal deflection plates 50 and 51 through conductors 52 and 54. The impression of the alternating potentials induced within the inductor coil 10 and within the timer coil 64 upon the vertical and horizontal deflection plates respectively produce Lissajous figures upon the fluorescent screen of the oscilliscope, as illustrated in Figure 4. Phase synchronism between the said induced alternating currents may be accomplished by adjustment of the angular position of the inductor coil 10 about the axis 17 by means of the handle 16 as described hereinbefore. When the induced alternating potentials impressed upon the oscilliscope are out of phase an elliptical Lissajous diagram, such as that illustrated at 124 in Figure 4 is described upon the fluorescent screen. When the phase relationship of the synchronous induced alternating electrical potentials are adjusted, as described, to an angle of 0 or 180 degrees the elliptical Lissajous figure will narrow to a single oblique line, as illustrated at 125.

The direction, with respect to the vertical, in which the line 125 slopes depends upon whether the induced currents are in phase or 180° out of phase and the direction of the slope may be correlated with and used to indicate the sense of the magnetic polarization of the core sample.

Having thus adjusted the phase angle between the induced currents, the plane of the component of the magnetic pole in the core sample is indicated by the position of the arrow 18 upon the graduations of the ring 15.

Figure 2 illustrates an optional type of apparatus for determining the resultant polar axis of the core sample in which, instead of rotating the core sample in the plane of the stationary inductor coil 10 as described in connection with Figure 1, the inductor coil is rotated about the stationary core sample container. The lower end of the motor shaft 73 carries an inductor coil 101 which is preferably identical in size and number of turns with the upper inductor coil 70 and is positioned on the said common shaft 73 in a plane parallel therewith. Each inductor coil comprises an equal number of turns of wire which are connected together with the slip rings 108 and 110 and as diagrammatically illustrated in Figure 6. The inductor coil windings 70 and 101 are connected in opposition to one another whereby upon rotation about the axis of the shaft 73 the extraneous induced alternating potentials caused by the earth's magnetic field, or other stray magnetic fields will be equal and opposite in each coil, and thus compensated will not appear at the slip rings 108 and 110, nor enter the indicating system.

However, the rotation of the inductor coil 70 about the magnetized core sample in the container since the magnetic field of the core sample is substantially confined to one rotating coil induces an alternating electromotive force which appears at the slip rings 108 and 110, and is taken off by the brushes 110 and 112 and conducted to a suitable amplifier $A_2$. The resultant amplified alternating current is conducted from $A_2$ through lines 118 and 120 to a sensitive alternating current galvanometer G. It may be desirable to incorporate a rectifier in the amplifier $A_2$ whereby the output will be direct current and can be conveniently measured by means of a sensitive D. C. galvanometer.

In the operation of the device of Figure 2 the preferable method of determining the resultant magnetic polar axis of the core sample comprises adjusting the position of the core sample within the gimbals ring 76 and supporting fork 77 to a position which upon rotation of the inductor coil 70 gives a minimum induced electromotive force in the rotating inductor coil 70, or in other words, a null position as indicated by a minimum or zero deflection of the needle of the galvanometer G. Under such conditions it is then known that the resultant magnetic polar axis of the core sample must be substantially coincident or parallel with the rotational axis of the inductor coil because this is the only position the magnetic lines of force can take within the rotating coil without inducing an effective potential therein.

If the top of the core sample is known, as it may be, by marking it upon removal from the core barrel, and with the magnetic polar axis located as just directed the sense and direction of the magnetic pole of the core sample is established.

Having established the resultant magnetic polarity of any core sample as described hereinbefore in order to complete the orientation of that core to its original position in space it is necessary to also know the vertical deviation of the bore hole and the dip and direction of the permanent magnetic field in the formation at the point from which the core sample was removed. The vertical deviation may be obtained by any one of the bore hole test methods well known in the art, for example, it may be obtained during the core drilling operations by means of a bore hole inclinometer or well survey instrument.

If the resultant magnetic polarity of the core has been established as described the angle between said magnetic pole and the longitudinal axis of the core sample can be readily measured upon the core sample by any suitable means such as a protractor or by means of the angular indications upon the graduated sectors 25 and 27 of Figure 1, or 79 and 85 of Figure 2. If the vertical deviation of the bore hole from which the core sample has been removed is known, the deviation of the said longitudinal axis of the core sample, assuming it to have been parallel with the drilled bore hole, is also known.

With these data together with the formational magnetic polarization at the point of removal of the core sample, the complete orientation of the core sample can be accomplished.

For example, referring to Figure 7, where the vertical deviation angle of the axis of the core sample axis A—B is $d$ and the angle between the resultant magnetic polar axis A—C and the longitudinal axis A—B of the core sample is $a$ and the magnetic dip angle is known to be $m$, then the direction $x$ of the component of maximum vertical deviation of the core sample with respect to the horizontal component of the north and south magnetic meridian C—D is given by the formula:

$$\text{Cos } X = \frac{\text{Cos } a - \text{Sin } m \text{ Sin } d}{\text{Cos } m \text{ Cos } d}$$

Since it is further known that the resultant magnetic pole of the core sample must lie in a vertical plane such as that passing through A—C—D and at an angle $m$ equal to the given magnetic dip at the point of removal of the core sample from the earth and since the top of the core sample is also known, then the orientation of the core sample about its longitudinal axis A—B is fully determined.

Having thus determined the position of the test core sample in space, it may be placed in its correspondingly oriented position in the core container of either apparatus illustrated in Figures 1 or 2 or in similarly constructed apparatus and the dip and strike of visible strata therein determined by inspection.

For this method of determining the dip and strike of the strata the core container is preferably constructed of transparent material.

A number of variations in apparatus and methods of operation can obviously be employed. For example, the apparatus of Figure 1 may be constructed to allow the inductor coil to rotate around the stationary core container in the manner of Figure 2. In the case of this construction the phase adjustment between the timer and the induced alternating current in the inductor coil would be adjusted by means of the handle 81 which permits rotational adjustment of the position of the core sample container about the vertical axis which is common to the rotational axis of the inductor coil.

Any variation of the apparatus is possible it being only necessary that relative rotation be effected between the core sample and the inductor coil whereby the magnetic lines of force of the core sample may induce an effective alternating electromotive force at the terminals of the windings thereof, coupled with means for determining the phase relationship between the said relative rotational position and the resultant induced electromotive force or means to measure the intensity of the resultant induced electromotive force or current.

It is preferable, however, to rotate the core within the inductor coil, because in this method the earth's magnetic field and other extraneous fields have substantially no effect upon the stationary inductor coil and consequently cause no vitiating induced potentials therein. As a further protection to the apparatus from the undesirable effects of stray electric and magnetic fields, the apparatus whether constructed in accordance with Figure 1 or Figure 2 may be completely housed within a suitable room or other inclosure shielded against electric and magnetic influences.

The inductor coils may be constructed to contain from 500 to 5000 turns of number 30–40 B. & S. gauge copper wire, the size of wire and number of turns, depending upon the size and inherent magnetic strength of the core samples to be tested.

The dip and direction of the permanent magnetic polarization of the earth strata from which core samples are obtained are believed, in the majority of cases, to coincide substantially with that of the present terrestrial magnetic field at the earth's surface at or near the point of recovery of the core sample. The dip and direction of the earth's magnetic field at any desired point of the earth's surface may be ascertained by several means which are well known, such as by a magnetic compass or needle which is free to rotate about both the horizontal and vertical axis, or an earth inductor or the like instrument.

In some localities the recovered core samples exhibit such extremely weak magnetic properties that it is difficult to determine their magnetic polarities with sufficient accuracy. In these cases it has been found possible to artificially impart increased magnetic properties to the formation being cored by circulating a drilling fluid laden with finely divided magnetic material such as powdered iron, permalloy, iron pyrites, magnetic iron oxide or the like ferro-magnetic alloys or compounds whereby the formation being drilled becomes impregnated with a coating thereof. The materials are preferably magnetized prior to introduction into the drilling fluid. They may, however, be utilized without prior magnetization, it being only necessary that the particles align themselves in the interstices of the impregnated formation with their axes of maximum permeability parallel with the lines of force of the earth's magnetic field present at the point of drilling, and that they acquire their magnetism while in place in the formation prior to detaching the core sample from the formation. If the thus impregnated core does not acquire permanent magnetization it will at least acquire an axis of maximum magnetic permeability which may be readily measured. Under these conditions the impregnated core sample has a magnetic field which coincides with that of the terrestrial magnetic field.

Wherever the term electric potential is employed in connection with phase relation determination it is to be understood that the term current is included and may be similarly applied.

The term orientation as employed herein is not limited to actually relocating the core samples with respect to the geographic north and south meridian and to the vertical but includes within its meaning orientation with respect to mathematical, imaginary or arbitrary coordinates whereby the actual orientation of the core in space can be computed or otherwise ascertained or whereby the actual dip and strike of strata exposed in such cores can be measured or computed.

In cases where the magnetic polarization of the earth strata has been the result of the orientation of the minute ferromagnetic particles during sedimentation, as mentioned hereinbefore, under the influence of the then existing terrestrial magnetic field, the present magnetization retained by the cored strata may differ slightly in direction from that of the present terrestrial magnetism. This may be due to either a subsequent change of location of the earth's magnetic poles or a shift in the position of the formations or both. The correction to be applied in the latter case may be ascertained by testing outcroppings of the stratum or other strata of like geologic age lying parallel with the strata under question to determine the magnitude of its magnetic polar deviation from the present terrestrial magnetic field. In cases where the present terrestrial magnetic field is known to coincide with that of the permanent magnetization of the stratum under test the method of this invention is applicable without application of any correction factors. In cases where the magnetization of the drilled stratum is unknown and differs in direction and dip from that of the present terrestrial magnetic field the method of this invention cannot be directly applied to a test upon a single core sample without liability of a slight error in the results due to the possibility that the magnetic axis of the formation under question may deviate from that of the present terrestrial magnetic field at the earth's surface. In any event the errors likely to accrue due to shifts in magnetic polarization of the earth strata are limited to small values.

Where increased magnetic properties are artificially imparted to the core sample by employing a drilling fluid carrying magnetic materials in suspension as described herein, the direction of the polarity of the recovered core will substantially coincide with that of the resultant terrestrial magnetic field at the ground surface above the drilled formation.

I claim:

1. A method for determining the resultant polar orientation of a magnetized body comprising imparting relative rotation between said body and an inductor coil whereby one plane of maximum magnetization of said body is established, imparting relative rotation between said body and said coil about an axis which is perpendicular to said first mentioned established plane and likewise establishing a second plane of maximum magnetization which intersects said first established plane and measuring the angle of the line of said intersection with respect to a given axis of said body.

2. A method for determining the resultant polar orientation of a magnetized body comprising imparting relative rotation between said body and an inductor coil whereby one plane of maximum magnetization of said body is established, imparting relative rotation between said body and said coil about an axis which is at an angle to said first-mentioned plane and likewise establishing a second plane of maximum magnetization which intersects said first established plane and measuring the angle of the line of said intersection with respect to a given axis of said body.

3. An apparatus for determining the magnetic polar orientation of a magnetized body comprising an inductor coil, a retainer for a magnetized body adjacent said coil, means to impart relative rotation between said retainer and said coil whereby an alternating electromotive force may be induced in said coil by the presence of a magnetized body in said retainer, means to vary the position of a magnetized body in said retainer whereby said rotation may be imparted about any desired axis of said magnetized body and means to indicate the relative change in amplitude of said induced alternating electromotive force with respect to a change of position of a magnetized body in said retainer.

4. An apparatus for determining the magnetic polar orientation of a magnetized body comprising an inductor coil, a retainer for a magnetized body adjacent said coil, means to impart relative rotation between said retainer and said coil whereby an alternating electromotive force may be induced in said coil by the presence of a magnetized body in said retainer, means to vary the position of a magnetized body in said retainer whereby said rotation may be imparted about any desired axis of said magnetized body.

5. An apparatus according to claim 4 with means to indicate changes in amplitude of said inducted electromotive force with changes in said axis of rotation.

6. An apparatus according to claim 4 with means to indicate the phase relationship between the induced alternating electromotive force and the angle of said relative rotation.

7. An apparatus for determining the magnetic polar orientation of a magnetized body comprising an inductor coil, a retainer for a magnetized body adjacent said coil, means to impart relative rotation between said retainer and said coil whereby an alternating electromotive force may be induced in said coil by the presence of a magnetized body in said retainer, means in the form of an auxiliary alternating current generator to generate a second pulsating electromotive force, means to maintain said second pulsating electromotive force in synchronism and at a known phase relationship with the rotation of said retainer and means to indicate the phase relationship between said first mentioned alternating electromotive force and said second pulsating electromotive force.

8. A method for determining the original orientation of a core sample comprising measuring the angle of the resultant magnetic polar axis of the core, with respect to the longitudinal axis of the said core, measuring the vertical deviation of the longitudinal axis of said core as indicated by a measurement of the inclination of the bore hole at the point of the core removal, and orienting said core so that its said resultant magnetic polar axis is parallel with the resultant magnetic field in the formation from which it has been removed and its said longitudinal axis is at an angle equal to the deviation angle.

9. A method for determining the dip and strike of earth strata penetrated by a bore hole comprising ascertaining the core orientation in accordance with claim 8 and measuring the dip and strike of a stratum the edges of which are exposed in said core.

10. A process for determining the connate orientation of a core sample comprising impregnating said core sample with a ferro-magnetic material prior to recovery from the bore hole, whereby the core sample is imparted increased ferro-magnetic properties, removing the core sample from the bore hole and determining the direction of the axis of maximum magnetic properties in said core sample.

11. In the art of rock sampling during deep drilling, the improvement which comprises the steps of introducing into the rock to be sampled a body of ferro-magnetic particles in such a state as to be susceptible of polar orientation under the influence of the earth's magnetic field, allowing said particles to become so oriented and fixing the particles to the rock while so oriented, and removing a sample of rock containing the fixed particles, thereby providing a magnetic index by means of which the original position of the sample in the earth can be determined after removal.

12. In the art of rock sampling during deep drilling, the improvement which comprises the steps of introducing contiguously to the rock to be sampled a body of ferro-magnetic particles in such a state as to be susceptible of polar orientation under the influence of the earth's magnetic field, allowing said particles to become so oriented in the absence of forces which distort the earth's field in the immediate locality of said particles, fixing the space relationship between the particles while so oriented and the rock to be sampled and removing a sample of the rock together with said particles without varying said fixed spaced relationship.

13. In the art of rock sampling during deep drilling, the improvement which comprises introducing into the rock to be sampled a body of tiny ferro-magnetic particles in fluid suspension capable of adhering to rock, said suspension being adapted to set a relatively short time after said introduction and allowing the suspension to set in the absence of forces which distort the earth's field in the locality of said suspension.

14. In the art of taking and orienting samples, a method which comprises introducing contiguously to the prospective rock sample a body of ferro-magnetic particles in such a state as to be adapted to become oriented under the influence of the earth's magnetic field, allowing said particles to become so oriented in the absence of forces which distort the earth's magnetic field in the immediate vicinity of the prospective sample, fixing the relationship between said particles while so oriented and said prospective sample, removing said sample together with said particles without varying their fixed relationship and determining the direction of remanent magnetization in said particles, whereby an index is afforded to the original position of said sample in the earth.

15. A method of taking rock core samples which comprises introducing into the rock to be cored a charge of magnetically susceptible material in a condition temporarily capable of polar orientation under the influence of the earth's magnetic field, allowing such orientation to take place and become fixed, and removing a core sample of the rock containing said materials.

LYLE DILLON.

CERTIFICATE OF CORRECTION.

Patent No. 2,260,562. October 28, 1941.

LYLE DILLON.

It is hereby certified that error appears in the printed specification of the above numbered patent requiring correction as follows: Page 4, first column, line 42, for "screen" read --screen 46--; page 6, first column, line 61, claim 2, after "first mentioned" insert --established--; and that the said Letters Patent should be read with this correction therein that the same may conform to the record of the case in the Patent Office.

Signed and sealed this 28th day of April, A. D. 1942.

(Seal)

Henry Van Arsdale,
Acting Commissioner of Patents.